United States Patent
Yan et al.

(10) Patent No.: US 12,461,393 B2
(45) Date of Patent: Nov. 4, 2025

(54) TRAVELING WAVE ELECTRODE MODULATOR AND PHOTONIC INTEGRATED CHIP

(71) Applicant: InnoLight Technology (Suzhou) LTD., Jiangsu (CN)

(72) Inventors: Dongdong Yan, Suzhou (CN); Xianyao Li, Suzhou (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 323 days.

(21) Appl. No.: 18/041,452

(22) PCT Filed: Aug. 3, 2021

(86) PCT No.: PCT/CN2021/110315
§ 371 (c)(1),
(2) Date: Feb. 13, 2023

(87) PCT Pub. No.: WO2022/042229
PCT Pub. Date: Mar. 3, 2022

(65) Prior Publication Data
US 2023/0296925 A1    Sep. 21, 2023

(30) Foreign Application Priority Data
Aug. 24, 2020   (CN) .......................... 202010855140.2

(51) Int. Cl.
*G02F 1/01* (2006.01)
(52) U.S. Cl.
CPC ............ *G02F 1/0102* (2013.01); *G02F 1/011* (2013.01); *G02F 2201/127* (2013.01)
(58) Field of Classification Search
CPC ... G02F 1/0102; G02F 1/011; G02F 2201/127
(Continued)

(56) References Cited

U.S. PATENT DOCUMENTS 4,844,572 A * 7/1989 Popovic .................. G02F 1/025
359/322
6,310,700 B1 * 10/2001 Betts ..................... G02F 1/2255
359/2

(Continued)

FOREIGN PATENT DOCUMENTS

| CN | 106646931 A | 5/2017 |
| CN | 111240052 A | 6/2020 |
| CN | 111373312 A | 7/2020 |

OTHER PUBLICATIONS

International Search Report and Written Opinion for International Application No. PCT/CN2021/110315 issued on Nov. 13, 2021.
(Continued)

*Primary Examiner* — Jerry M Blevins
(74) *Attorney, Agent, or Firm* — Finnegan, Henderson, Farabow, Garrett & Dunner, LLP (57) ABSTRACT

A traveling wave electrode modulator and a photonic integrated chip including the same. The traveling wave electrode modulator comprises a silicon base, an optical waveguide and a doped transitional area disposed in the silicon base, and a traveling wave electrode structure electrically connected to the transitional area. The traveling wave electrode structure comprises at least one layer of a continuous electrode continuously extending along the direction of extension of the optical waveguide, at least one layer of a periodic electrode periodically disposed along the direction of extension of the optical waveguide, and a conductive structure. The continuous electrode is electrically connected to the periodic electrode via the conductive structure, and the traveling wave electrode structure is electrically connected to the transitional area via the conductive structure.

10 Claims, 5 Drawing Sheets

(58) Field of Classification Search
USPC .......................................................... 385/2
See application file for complete search history.

(56) References Cited

U.S. PATENT DOCUMENTS

2014/0355926 A1   12/2014   Velthaus
2017/0052422 A1*   2/2017   Kazlas ................. G06F 3/0412

OTHER PUBLICATIONS

Chinese Office Action issued by the State Intellectual Property Office (SIPO) of the People's Republic of China on May 24, 2023, in counterpart Chinese Application No. 202010855140.2.
Chinese Office Action issued by the State Intellectual Property Office (SIPO) of the People's Republic of China on Dec. 29, 2023, in counterpart Chinese Application No. 202010855140.2.

* cited by examiner

TRAVELING WAVE ELECTRODE MODULATOR AND PHOTONIC INTEGRATED CHIP

CROSS-REFERENCE TO RELATED APPLICATION

This application is a U.S. National Phase Application of International Application No. PCT/CN2021/110315, filed Aug. 3, 2021, which claims priority to Chinese Application No. 202010855140.2, filed Aug. 24, 2020, the entire contents of all of which are incorporated herein by reference.

FIELD OF THE DISCLOSURE

The present application relates to the field of optical communication technology and, more particularly, to a traveling wave electrode modulator and a photonic integrated chip.

BACKGROUND

In silicon-based integrated optoelectronic systems, traveling wave electrode modulators are widely used due to their higher extinction ratio and ease of integration. Traveling wave electrode modulators are usually manufactured as silicon-based electro-optical modulators based on silicon-on-insulator (SOI) technology. A traveling wave electrode modulator manufactured based on the SOI technology generally includes a loaded optical waveguide and traveling wave electrodes. An electromagnetic wave propagates between the traveling wave electrodes, and an optical carrier propagates in the loaded optical waveguide. As the optical carrier and the electromagnetic wave propagate, interactions between the electromagnetic wave and the optical carrier causes change in the phase of the optical carrier, thereby completing a modulation of an optical signal with an electrical signal. The main performance indicators of a traveling wave electrode modulator include its electro-optical bandwidth and impedance. A higher electro-optical bandwidth and an appropriate impedance are usually desired in a design. There are two main factors that affect the electro-optical bandwidth: the first factor is the loss in the loaded traveling wave electrode, and the second factor is the degree of matching between a group velocity of a microwave and a group velocity of an optical carrier of the traveling wave electrode modulator. In actual use, the propagation speed of an electromagnetic wave in the traveling wave electrode is different from the propagation speed of an optical wave in the optical waveguide, and the former speed is typically higher than the latter speed. Therefore, a certain degree of mismatching exists between the electromagnetic wave and the optical wave. As a result of the mismatch, in the modulation process, a high-speed signal cannot fully interact with the optical wave which it met when entering the traveling wave electrode in the entire process. This leads to reduced electro-optical modulation bandwidth of the traveling wave electrode modulator overall, thereby lowering the performance of the modulator overall.

SUMMARY

Embodiments of the present disclosure provide a traveling wave electrode modulator and a photonic integrated chip that have a higher degree of electro-optical matching and are capable of providing a higher electro-optical modulation bandwidth.

In one aspect, embodiments of the present disclosure provide a traveling wave electrode modulator including a silicon base, an optical waveguide disposed in the silicon base, a doped transitional area disposed on both sides of the optical waveguide, and connected to the optical waveguide, and a traveling wave electrode structure electrically connected to the transitional area. The traveling wave electrode structure includes at least one layer of a continuous electrode continuously extending along a direction of extension of the optical waveguide, at least one layer of a periodic electrode periodically disposed along the direction of extension of the optical waveguide, and a conductive structure. The continuous electrode is electrically connected to the periodic electrode via the conductive structure, and the traveling wave electrode structure is electrically connected to the transitional area via the conductive structure.

In a further improved embodiment, the traveling wave electrode structure includes at least two or more layers of the periodic electrode, or two or more layers of the continuous electrode.

In a further improved embodiment, the periodic electrode and the continuous electrode are disposed in an alternating manner, or the two or more layers of the periodic electrode are disposed in an adjacent manner.

In a further improved embodiment, structural parameters of the periodic electrodes in different layers are identical or different. The structural parameters include period and duty cycle.

In a further improved embodiment, the continuous electrode and the periodic electrode each includes a signal electrode and a ground electrode. The signal electrode and the ground electrode in the same layer have an electrode spacing distance between them. The electrode spacing distances in different layers may be identical or different.

In a further improved embodiment, the conductive structure includes an conductive via.

In a further improved embodiment, the silicon base includes, layered sequentially, a silicon substrate, an insulation layer, and an optical waveguide layer. The optical waveguide and the transitional area are located in the optical waveguide layer. The traveling wave electrode structure is disposed above the optical waveguide layer.

In a further improved embodiment, a groove is disposed at a surface of the silicon substrate near the insulation layer, the groove being located below the optical waveguide and disposed along the optical waveguide. Alternatively, a channel penetrating through a top surface and a bottom surface of the silicon substrate is disposed in an area of the silicon substrate below the optical waveguide.

In a further improved embodiment, a cover layer is disposed above the optical waveguide layer, and the traveling wave electrode structure is disposed in the cover layer.

Embodiments of the present disclosure further provide a photonic integrated chip including the traveling wave electrode modulator of any of the embodiments described above.

DETAILED DESCRIPTION

The text below provides a detailed description of the embodiments of the present disclosure in conjunction with specific embodiments illustrated in the attached drawings. However, these embodiments do not limit the present disclosure; the scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present disclosure are only for the purpose of illustrating the basic structure of the subject matter of the present disclosure.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another member or layer or "connected to" another member or layer, it may be directly above the other member or layer or directly connected to the other member or layer, or there may be an intermediate component or layer.

Figure 1:
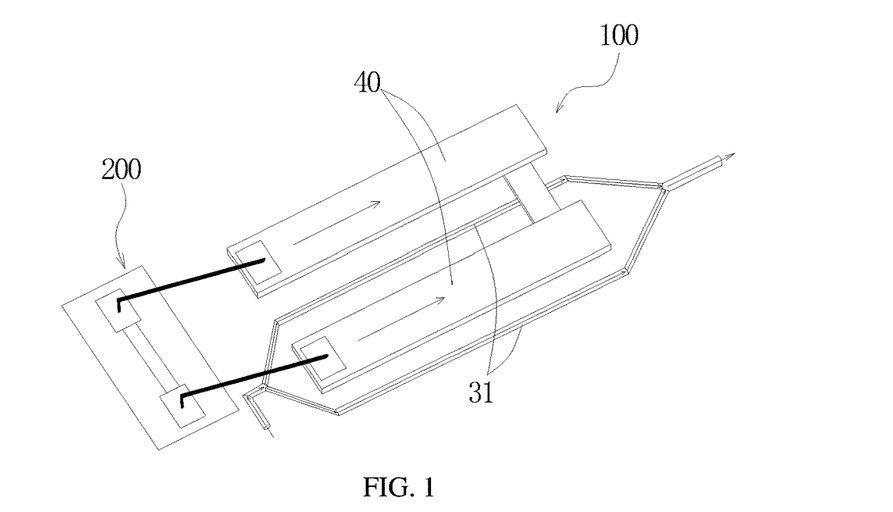
FIG. 1 is a diagram illustrating a commonly used optical modulation system.
Figure 2:
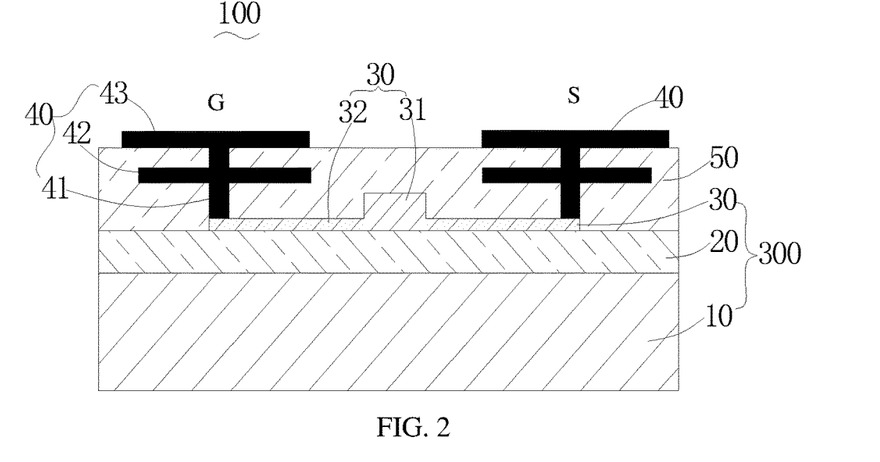
FIG. 2 is a diagram illustrating a cross section of a modulator according to a first embodiment of the present disclosure.

Traveling wave electrode modulators are categorized into unipolar drive and bipolar drive by their drive mode; and into series push-pull structure, separate dual-arm structure, and other structures by their optical waveguide layout. As illustrated in FIG. 1, in general, a traveling wave electrode modulation system mainly includes a driver 200 and a traveling wave electrode modulator 100. Silicon-based traveling wave electrode modulators have become a top choice because they are capable of obtaining higher extinction ratio and are easier to integrate. Silicon-based traveling wave electrode modulators are manufactured mainly based on CMOS-SOI technology, that is, manufactured on the basis of silicon-on-insulator (SOI) by using complementary metal-oxide-semiconductor (CMOS) manufacturing technology. FIG. 2 illustrates a cross section of a modulation area of the traveling wave electrode modulator 100 manufactured based on the CMOS-SOI technology. The traveling wave electrode modulator 100 includes, layered sequentially, a silicon substrate 10, an insulation layer 20, an optical waveguide layer 30, and a traveling wave electrode structure 40 disposed above the optical waveguide layer 30. A cover layer 50 that is insulating may also be disposed on the optical waveguide layer 30. Here, the silicon substrate 10 is generally formed of low resistivity silicon. The insulation layer 20 is generally formed of an insulating oxide, such as silicon dioxide. The optical waveguide layer 30 is generally formed by etching a top-layer silicon in a SOI structure, and the optical waveguide layer 30 includes an optical waveguide 31 and a transitional area 32 formed by doping both sides of the optical waveguide 31. That is, after the optical waveguide 31 is formed by etching the top-layer silicon in the SOI structure, the transitional area 32 is formed by doping both sides of the optical waveguide 31 using semiconductor doping technology to form a PN junction at the optical waveguide 31. Then a dielectric material and metal materials are deposited on the optical waveguide layer 30 using CMOS manufacturing technology, to form the cover layer 50, metal layers deposited inside the cover layer 50 and on a top surface of the cover layer 50, and a conductive structure connecting said metal layers. In the process of depositing the metal materials, the metal layers and the conductive structure are deposited according to the design of the traveling wave electrode structure 40 to form a traveling wave electrode 42 and an electrically conductive structure 41. The traveling wave electrode 42 is electrically connected to the transitional area 32 on both sides of the optical waveguide 31 via the conductive structure 41. A plurality of metal layers may be deposited as needed inside the cover layer 50 to form two or more layers of the traveling wave electrode 42.

Figure 3:
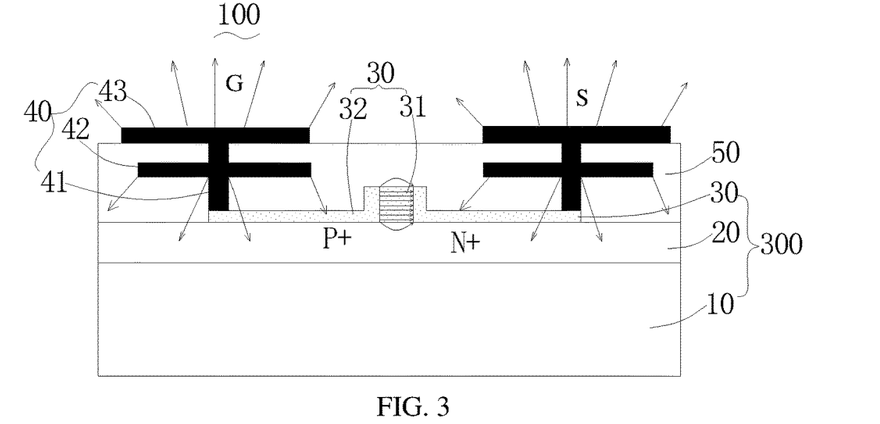
FIG. 3 is a diagram illustrating an electromagnetic field distribution in a modulator according to the first embodiment of the present disclosure.

The principle of operation of the traveling wave electrode modulator is as follows. The driver 200 is electrically connected to the traveling wave electrode modulator 100 via bonding wires. The optical waveguide 31 is placed in an electric field of the traveling wave electrode structure 40. A high-speed digital signal outputted from the driver 200 goes to the traveling wave electrode modulator 100 and propagates along the electrodes of the traveling wave electrode structure 40, while an optical carrier propagates in the optical waveguide 31. As illustrated in FIG. 3, which illustrates an electromagnetic field distribution in the traveling wave electrode modulator 100 of FIG. 2, the digital signal is applied, respectively, to the transitional area 32 on both sides of the optical waveguide 31 via the traveling wave electrode 42 and the electrically conductive structure 41, forming an electromagnetic field (represented by arrow-headed lines in FIG. 3) in the PN junction. At the same time, the electromagnetic field between the adjacent signal electrode S and ground electrode G is very weak, resulting in less loss. Change of the electric field caused by the high-speed digital signal in the traveling wave electrode structure 40 changes the electromagnetic field in the PN junction, thereby changing the concentration of charge carriers in the optical waveguide 31 to cause the effective refractive index of the optical waveguide 31 to change. Therefore, when the high-speed digital signal propagates on the traveling wave electrode structure 40, the electric field caused by the high-speed digital signal causes the refractive index of the optical waveguide 31 to change and thereby changes the phase of the optical carriers, causing the optical carriers to carry information from the digital signal. The optical carriers interfere in a Mach-Zehnder interferometer at a rear end and thereby completes modulation.

In accordance with embodiments of the present disclosure, during the traveling wave electrode depositing process, an electrode with a periodic structure along the direction of the waveguide is formed by depositing different periodic patterns at different metal layers, and the periodic structure may slow down the propagation speed of an electromagnetic wave. By controlling the number of the deposited metal layers and the size of the patterns of the deposited metal layers, the degree of matching between the electromagnetic wave and the optical wave is higher, thereby increasing the modulation bandwidth of the traveling wave electrode modulator. Details are provided in the following embodiments.

Embodiment 1

Figure 4:
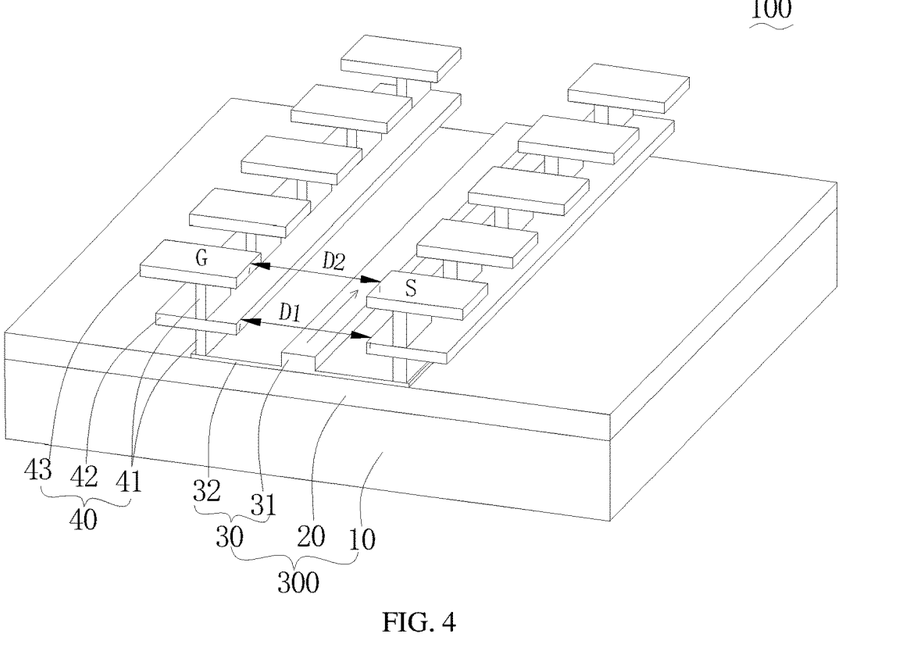
FIG. 4 is a structural diagram illustrating a modulator according to the first embodiment of the present disclosure.

As illustrated in FIGS. 2-4, the first embodiment of the present disclosure provides the traveling wave electrode modulator 100 including a silicon base 300, the optical waveguide 31 disposed in the silicon base 300, the doped transitional area 32 disposed on both sides of the optical waveguide 31, and connected to the optical waveguide 31, and the traveling wave electrode structure 40 electrically connected to the transitional area 32. Here, the silicon base 300 is a silicon-on-insulator (SOI) structure and includes, layered sequentially, the silicon substrate 10, the insulation layer 20, and the optical waveguide layer 30. The optical waveguide layer 30 is formed by etching the top-layer silicon of the SOI structure and includes the optical waveguide 31 and the transitional area 32 formed by doping both sides of the optical waveguide 31. The traveling wave electrode structure 40 is disposed above the optical waveguide layer 30. The cover layer 50 is disposed between the optical waveguide layer 30 and the traveling wave electrode structure 40 and between various electrodes at different layers. In FIG. 4, the cover layer 50 is omitted to clearly show the structure of the various electrodes at different layers. The cover layer 50 may be formed of a dielectric material, such as silicon dioxide. In other embodiments, the cover layer 50 may not be needed when the conductive structure is sufficient to support the various layers of electrode. In other words, in such other embodiments, air serves as the dielectric material between the optical waveguide layer 30 and the traveling wave electrode structure 40. The aforementioned traveling wave electrode structure 40 includes at least one layer of a continuous electrode 42 continuously extending along a direction of extension of the optical waveguide 31, at least one layer of a periodic electrode 43 periodically disposed, i.e., in a periodic pattern, along the direction of extension of the optical waveguide 31, and a conductive structure 41. The continuous electrode 42 is electrically connected to the periodic electrode 43 via the conductive structure 41, and the traveling wave electrode structure 40 is electrically connected to the transitional area 32 via the conductive structure 41.

In the first embodiment, the traveling wave electrode structure 40 includes one layer of the continuous electrode 42, one layer of the periodic electrode 43, and the conductive structure 41. The conductive structure 41 includes a conductive via that electrically connects the continuous electrode 42 and the transitional area 32, as well as a conductive via that electrically connects the continuous electrode 42 and the periodic electrode 43. Here, the conductive structure 41 between the continuous electrode 42 and transitional area 32 may be either conductive vias arranged in intervals along a lengthwise direction of the continuous electrode 42, or a continuous bar-shaped conductive structure. The height spacing distance between the continuous electrode 42 and the transitional area 32 (i.e., the height of the conductive structure) may be made small to the extent possible. Given limitations associated with the manufacturing technology and condition, the height spacing distance may be configured to be the extreme spacing distance as limited by the manufacturing technology and condition, for example, 0.1 µm, or slightly larger than the extreme spacing, for example, between 0.1 µm and 10 µm. The continuous electrode 42 enables an electromagnetic wave to propagate along the direction of extension of the optical waveguide 31, and the periodic electrode 43 slows down the propagation speed of the electromagnetic wave to increase the degree of matching between the propagation speed of the electromagnetic wave and the propagation speed of the optical carrier propagating in the optical waveguide 31, thereby increasing the modulation bandwidth of the traveling wave electrode modulator. In the first embodiment, the periodic electrode 43 is located above the continuous electrode 42, with the period of the periodic electrode 43 in the range of 50 µm-100 µm and its duty cycle in the range of 90-99. In other embodiments, the period and the duty cycle of the periodic electrode 43 may be designed in consideration of the impact of a combination of other specific parameters of the modulator on the propagation speed of the electromagnetic wave, in order to achieve a higher degree of matching between the electromagnetic wave propagating on the traveling wave electrode structure and the optical carrier propagating in the optical waveguide.

In the first embodiment, the traveling wave electrode structure 40 is formed as a GS traveling wave electrode, and the continuous electrode 42 and periodic electrode 43 each includes a signal electrode S and a ground electrode G. Other embodiments may alternatively use different types of electrodes, such as GSG or GSSG. The signal electrode S and the ground electrode G in the same layer (formed from the same metal layer formation at the same height) have an electrode spacing distance between them, and the electrode spacing distances between the signal electrode S and the ground electrode G in different layers may be identical or different. In the first embodiment, as shown in FIG. 4, the signal electrode S and the ground electrode G of the continuous electrode 42 have an electrode spacing distance D1 between them, the signal electrode S and the ground electrode G of the periodic electrode 43 have an electrode spacing distance D2 between them, and the electrode spacing distance D1 is identical to the electrode spacing distance D2. In other embodiments, the electrode spacing distances in different layers may be different. The widths of electrodes in different layers (along a direction perpendicular to the direction of extension of the optical waveguide 31) may be identical or different. The traveling wave electrode structure 40 that includes at least one layer of the continuous electrode 42 and at least one layer of the periodic electrode 43 adds a plurality of flexibly designable parameters, such as the period, duty cycle, electrode spacing distance, electrode width, and conductive via, that affect the propagation speed of an electromagnetic wave, thereby enhancing the design flexibility of the modulator and enabling a higher degree of matching between the electromagnetic wave and the optical carrier propagating in the optical waveguide. As a result, a higher modulation bandwidth for the traveling wave electrode modulator is achieved.

Embodiment 2

Figure 5:
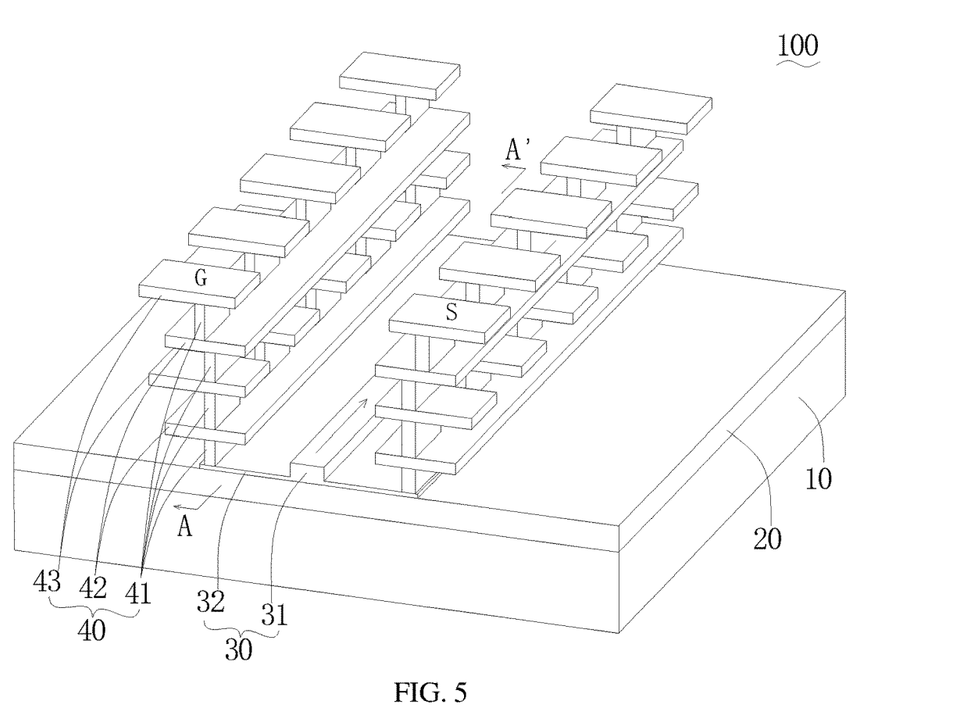
FIG. 5 is a structural diagram illustrating the modulator according to a second embodiment of the present disclosure.
Figure 6:
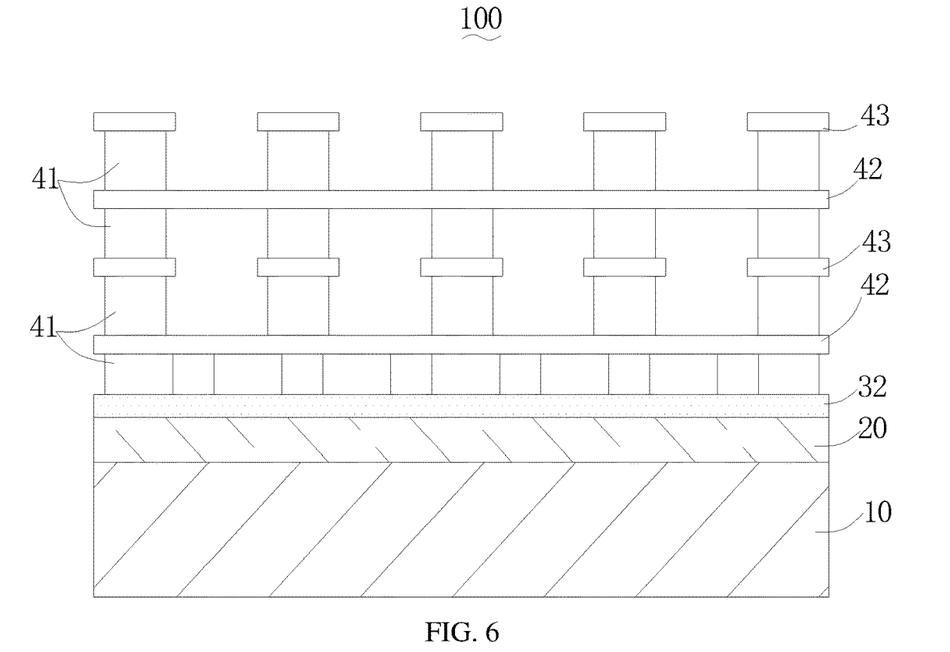
FIG. 6 is a cross-sectional view of the modulator of FIG. 5 along a section line A-A'.

FIGS. 5 and 6 illustrate a modulator according to a second embodiment. The modulator of the second embodiment differs from the modulator of the first embodiment in that the traveling wave electrode structure 40 includes two layers of the continuous electrodes 42 and two layers of the periodic electrodes 43, and that the periodic electrodes 43 and the continuous electrodes 42 are disposed in an alternating manner. In FIG. 5, and in FIG. 6 that is a cross-sectional view along a section line A-A' in FIG. 5, the cover layer 50 is omitted to clearly show the structure of the various electrodes in different layers. The periods and duty cycles of the periodic electrodes 43 in different layers may be identical or different, and the electrode spacing distances between the signal electrode S and the ground electrode G of the electrodes in different layers may be identical or different. All of these parameters may be designed according to the actual structure of the modulator with the goal of achieving a full matching between the propagation speed of the electromagnetic wave and the propagation speed of the optical carrier.

Figure 7:
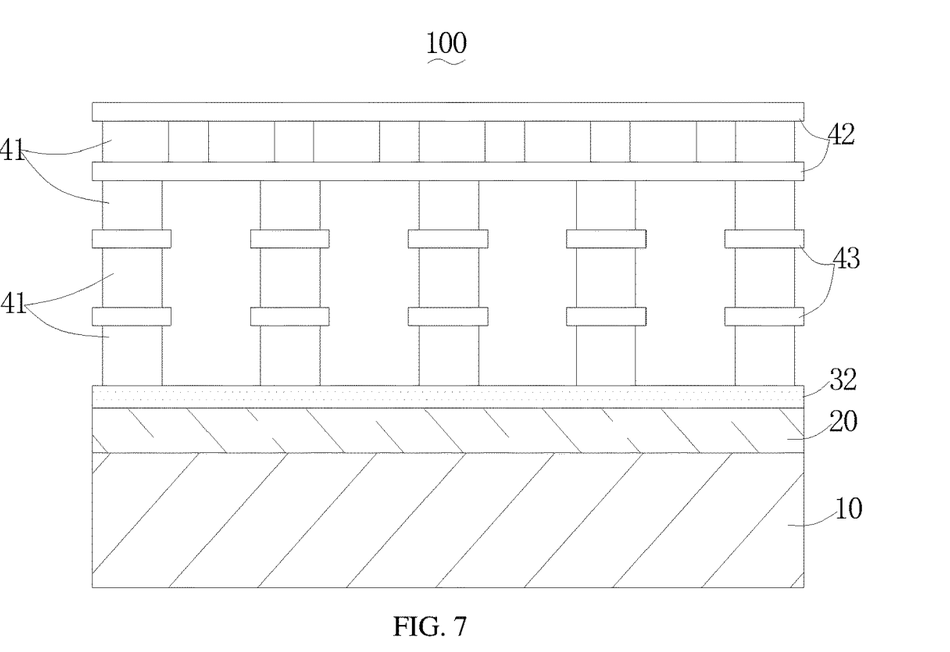
FIG. 7 is a diagram illustrating an electrode structural of a modulator according to a variation of the second embodiment of the present disclosure.
Figure 8:
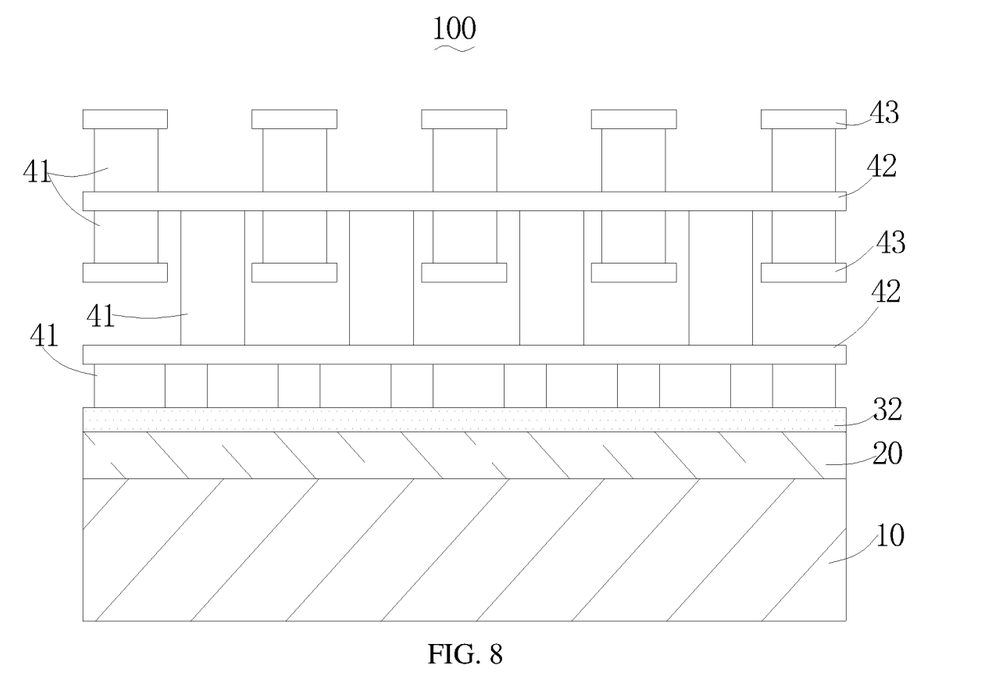
FIG. 8 is a diagram illustrating an electrode structural of a modulator according to another variation of the second embodiment of the present disclosure.

In other embodiments, the periodic electrodes 43 and the continuous electrodes 42 in different layers may be disposed in different sequences by design based on actual needs, rather than in an alternating manner. As illustrated in FIG. 7, that illustrates a variation of the second embodiment, above the transitional area 32, the conductive structure 41 connects, sequentially, two layers of the periodic electrodes 43 and two layers of the continuous electrodes 42. Alternatively, electrodes in different layers may be electrically connected by the conductive structure 41 in an alternating manner; in other words, an electrode may be electrically connected to an electrode in a higher layer, skipping an electrode in an adjacent layer. As illustrated in FIG. 8, that illustrates another variation of the second embodiment, the transitional area 32 is electrically connected to the continuous electrode 42 in a first layer via the conductive structure 41; the continuous electrode 42 in the first layer is electrically connected to the continuous electrode 42 in a third layer, skipping the periodic electrode 43 in a second layer; and the continuous electrode 42 in the third layer is then electrically connected to the periodic electrodes 43 in the second layer and a fourth layer, respectively. In other words, the way that electrodes in different layers are electrically connected is not limited, and different ways of electrical connection may be designed according to actual needs. Additional layers of the continuous electrodes and/or additional layers of the periodic electrodes may be configured, and the number of layers of the continuous electrodes and the number of layers of the periodic electrodes may be different. For example, two layers of the continuous electrodes and three layers of the periodic electrodes may be configured.

Embodiment 3

Figure 9:
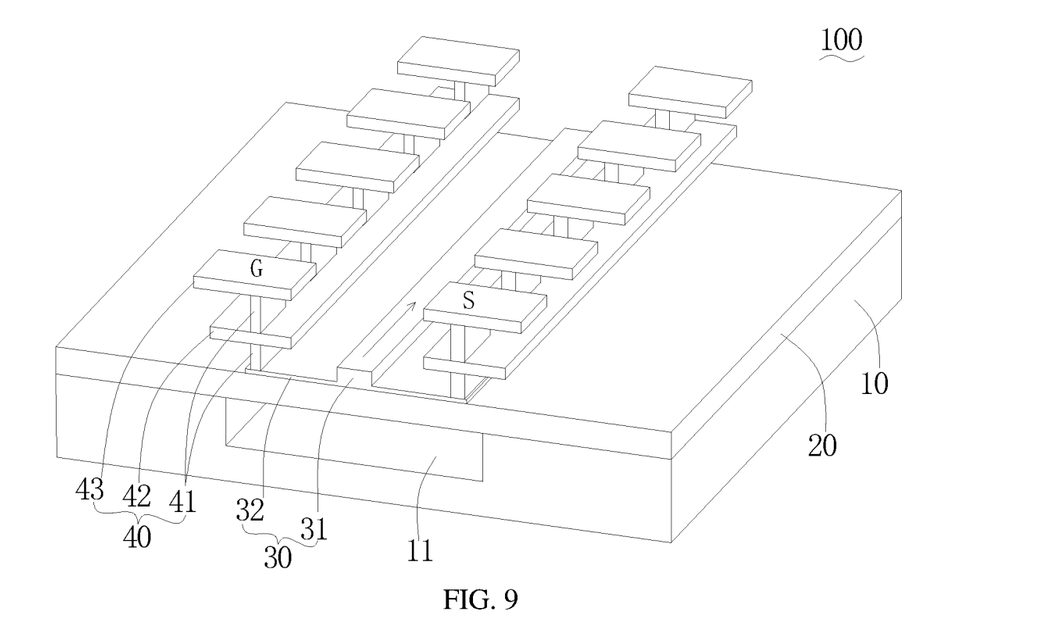
FIG. 9 is a structural diagram illustrating a modulator according to a third embodiment of the present disclosure.

As illustrated in FIG. 9, on the basis of any of the embodiments described above, a third embodiment adds a groove 11 on a surface of the silicon substrate 10 near the insulation layer 20. The groove 11 is located below the optical waveguide 31 and is disposed along the optical waveguide 31. By disposing the groove 11 on the silicon substrate 10 below the optical waveguide 31, i.e., hollowing a portion of the silicon substrate 10 below the optical waveguide 31 and thus forming a hollow structure between the silicon substrate 10 and the insulation layer 20, distribution of the electromagnetic field in the silicon substrate 10 may be reduced, thereby reducing loss of the electromagnetic field in the substrate 10, thereby reducing a microwave loss of the traveling wave electrode, which may further improve the electro-optical bandwidth of the electro-optical modulator 100. Here, the shape of a cross-sectional area of the groove 11 may vary depending on the actual manufacturing technology. For example, the cross-sectional area of the groove 11 may be a rectangle, as illustrated in FIG. 9, or the cross-sectional area of the groove 11 may have a semi-elliptical or another regular or irregular shape in another embodiment. The groove may alternatively be filled with a lossless dielectric material, such as silicon dioxide, ceramic, resin, or glue, to increase the mechanical strength of the modulator.

Figure 10:
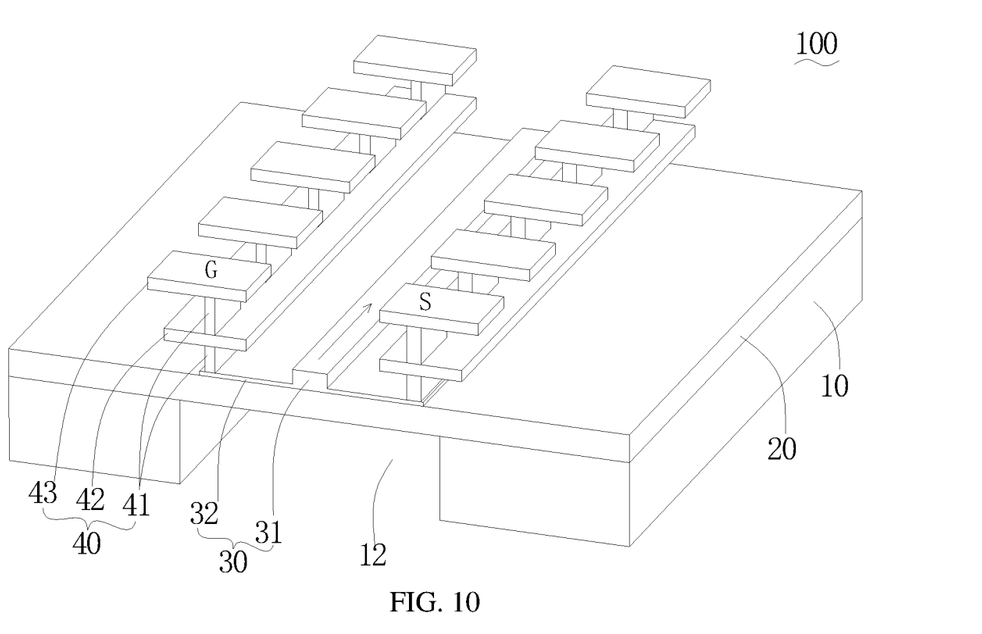
FIG. 10 is a structural diagram illustrating a modulator according to a variation of the third embodiment of the present disclosure.

In other embodiments, the aforementioned groove may alternatively be a channel that penetrates through the silicon substrate. As illustrated in FIG. 10, that illustrates a variation of the third embodiment, a channel 12 penetrating through a top surface and a bottom surface of the silicon substrate 10 is formed by hollowing an area of the silicon substrate 10 below the optical waveguide 31, in order to reduce loss of the electromagnetic field in the silicon substrate 10, thereby reducing the microwave loss of the traveling wave electrode and further improving the electro-optical bandwidth of the electro-optical modulator 100. The channel 12 may alternatively be filled with a lossless dielectric material, such as silicon dioxide, ceramic, resin, or glue, to increase the mechanical strength of the modulator.

Embodiment 4

A fourth embodiment of the present disclosure provides a photonic integrated chip, the photonic integrated chip is formed with the traveling wave electrode modulator in any of the first through third embodiments. The photonic integrated chip may also be designed to include active or passive optical devices, such as a photodetector, a wavelength division multiplexer/demultiplexer, a coupler, and/or a mode size converter.

Embodiment of the present disclosure provides the following benefits. With the addition of the electrode designed in a periodic pattern on the traveling wave electrode structure, a greater number of designable parameters are provided, the flexibility in the design of the traveling wave electrode structure is increased, and an increased degree of matching is provided between the propagation speed of electromagnetic waves and the propagation speed of optical carriers, thus effectively increasing the electro-optical modulation bandwidth of the modulator.

The series of detailed descriptions above is only intended to provide specific descriptions of feasible embodiments of the present disclosure. They are not to be construed as limiting the scope of protection for the present disclosure. All equivalent embodiments or changes that are not detached from the technology of the present disclosure in essence should fall under the scope of protection of the present disclosure.

What is claimed is:

1. A traveling wave electrode modulator, comprising:
a silicon base;
an optical waveguide disposed in the silicon base and configured to transmit optical waves;
doped transitional areas disposed on both sides of the optical waveguide, and connected to the optical waveguide to form a PN junction; and a traveling wave electrode structure electrically connected to each of the transitional areas, wherein the traveling wave electrode structure comprising:
 at least one layer of a continuous electrode continuously extending along a direction of extension of the optical waveguide;
 at least one layer of a periodic electrode periodically disposed along the direction of extension of the optical waveguide; and
 a conductive structure, the continuous electrode being electrically connected to the periodic electrode via the conductive structure, and the traveling wave electrode structure being electrically connected to the transitional area via the conductive structure,
wherein the continuous electrode and the periodic electrode each include a signal electrode and a ground electrode,
a spacing between adjacent signal electrode and ground electrode located in a same layer is configured to reduce an electromagnetic field strength between the adjacent signal electrode and ground electrode,
the traveling wave electrode structure is configured to transmit a digital signal and apply the digital signal to the transitional areas on both sides of the optical waveguide to generate an electromagnetic field in the PN junction, and
variations in the digital signal modulate the electromagnetic field, thereby changing a charge carrier concentration in the optical waveguide to alter a refractive index of the optical waveguide.

2. The traveling wave electrode modulator of claim 1, wherein the traveling wave electrode structure comprises at least two or more layers of the periodic electrodes, or at least two or more layers of the continuous electrodes.

3. The traveling wave electrode modulator of claim 2, wherein the periodic electrode and the continuous electrode are disposed in an alternating manner, or the two or more layers of the periodic electrodes are disposed in an adjacent manner.

4. The traveling wave electrode modulator of claim 2, wherein structural parameters of the periodic electrodes in different layers are identical or different; the structural parameters comprising period and duty cycle.

5. The traveling wave electrode modulator of claim 1, wherein
 the electrode spacing distances between the signal electrodes and the ground electrodes in different layers are identical or different.

6. The traveling wave electrode modulator of claim 1, wherein the conductive structure comprises a conductive via.

7. The traveling wave electrode modulator of claim 1, wherein the silicon base comprises, layered sequentially, a silicon substrate, an insulation layer, and an optical waveguide layer,
 the optical waveguide and the transitional areas are located in the optical waveguide layer, and
 the traveling wave electrode structure is disposed above the optical waveguide layer.

8. The traveling wave electrode modulator of claim 7, wherein a groove is disposed at a surface of the silicon substrate near the insulation layer, the groove being located below the optical waveguide and disposed along the optical waveguide, or
 a channel penetrating through a top surface and a bottom surface of the silicon substrate is disposed in an area of the silicon substrate below the optical waveguide.

9. The traveling wave electrode modulator of claim 7, wherein a cover layer is disposed above the optical waveguide layer, and the traveling wave electrode structure is disposed in the cover layer.

10. A photonic integrated chip, comprising the traveling wave electrode modulator of claim 1.

* * * * *